UNITED STATES PATENT OFFICE.

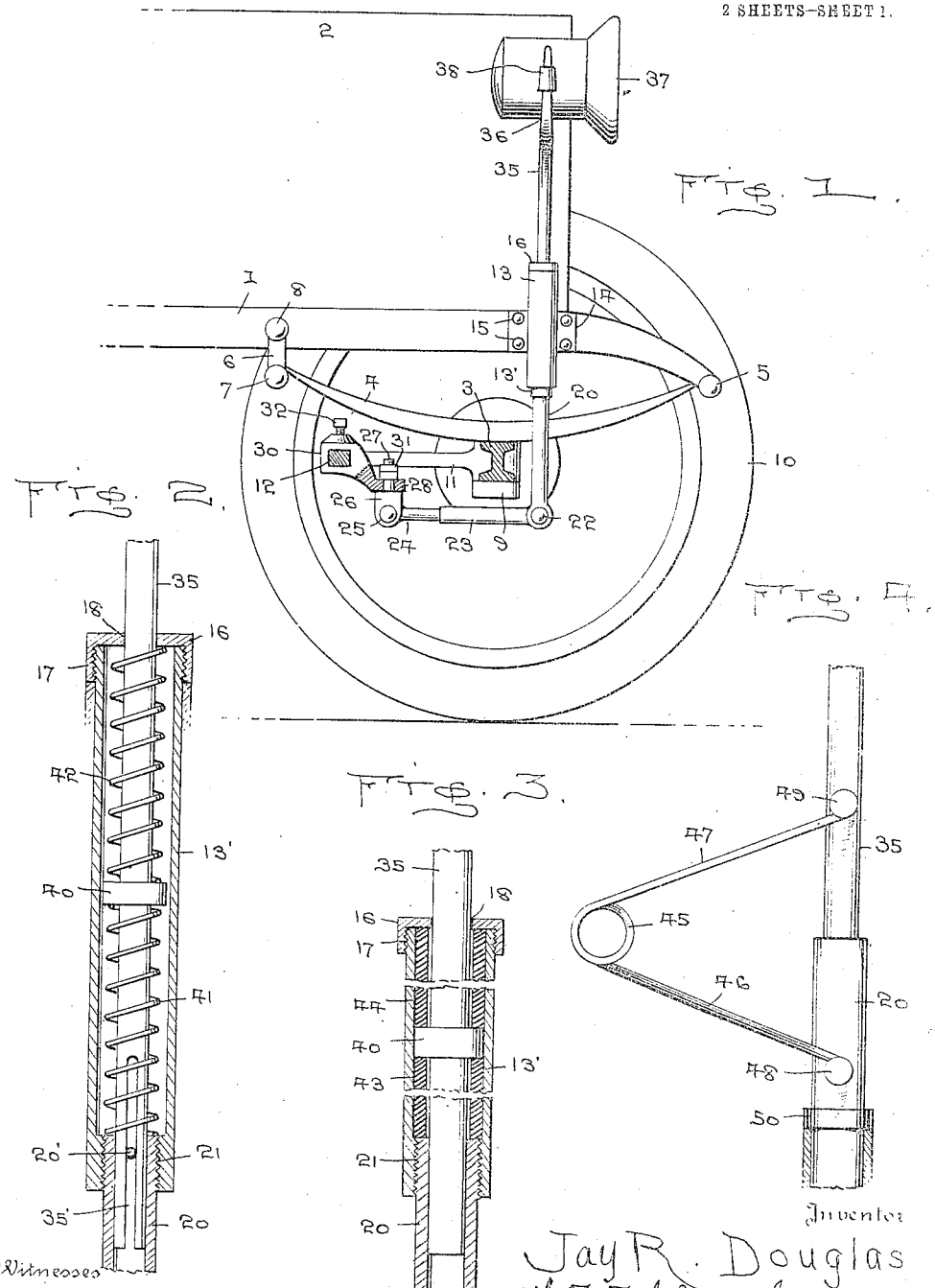

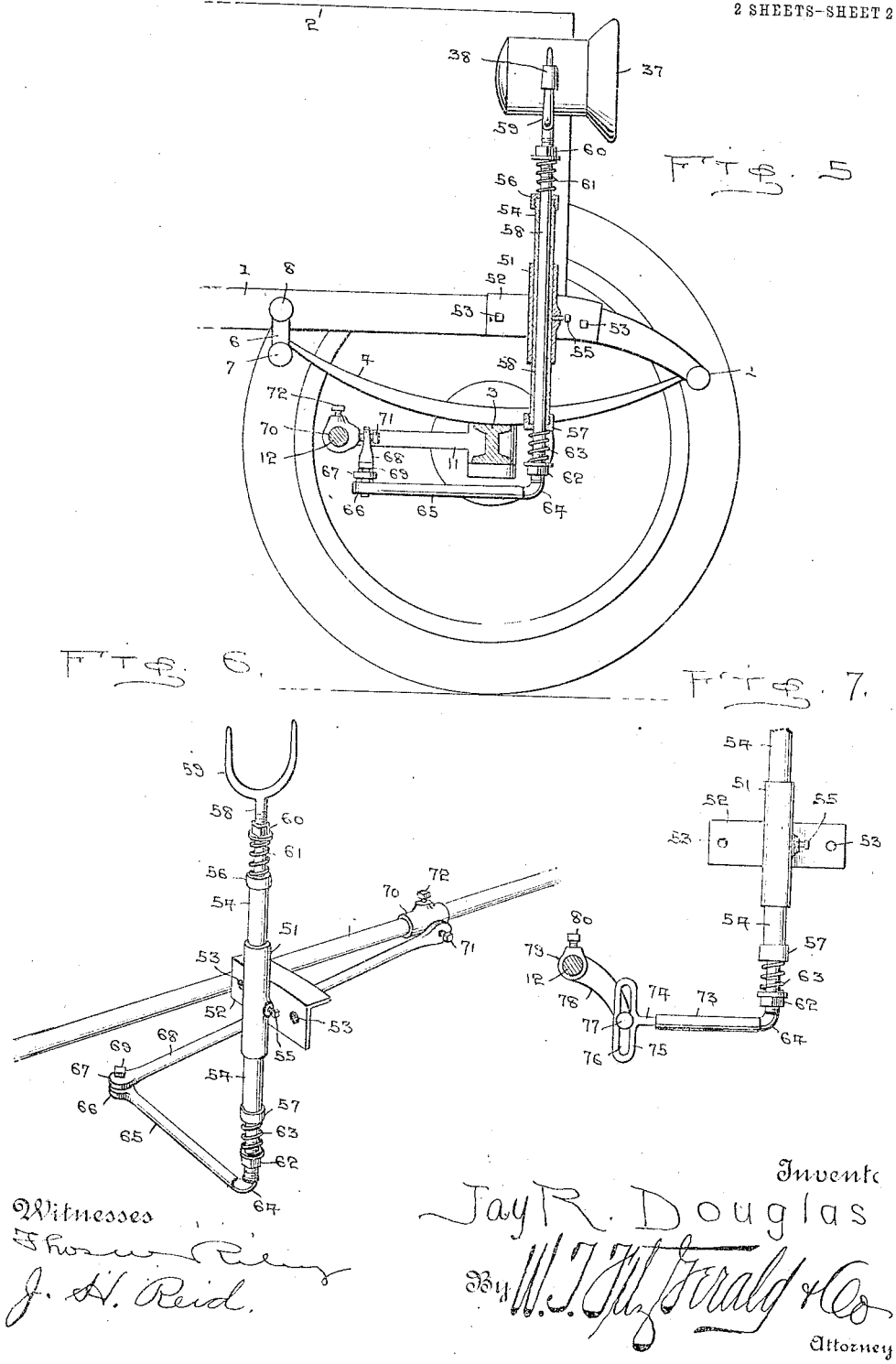

JAY R. DOUGLAS, OF MOUND CITY, KANSAS, ASSIGNOR OF ONE-HALF TO W. G. SHINKLE, OF MOUND CITY, KANSAS.

HEADLIGHT CONTROL FOR AUTOMOBILES, &c.

1,123,182.  Specification of Letters Patent.  Patented Dec. 29, 1914.

Application filed February 10, 1914. Serial No. 817,897.

*To all whom it may concern:*

Be it known that I, JAY R. DOUGLAS, a citizen of the United States, residing at Mound City, in the county of Linn and State of Kansas, have invented certain new and useful Improvements in Headlight Control for Automobiles, &c.; and I do hereby declare the following to be a full, clear, and exact description of the invention, such as will enable others skilled in the art to which it appertains to make and use the same.

This invention relates to head lights for automobiles and other vehicles and has for one of its objects the provision of means for projecting the rays of light in the direction of the line of travel of the vehicle.

Another object of this invention is the provision of means for causing the lateral deflection of the rays of light simultaneously and in unison with the movement of the front wheels of the vehicle.

A further object of this invention is the provision of means for absorbing the shocks which may be transmitted to the head light due to any unevenness of the surface over which the vehicle may travel, and further provision of means for preventing rebounding action upon the head light resulting from the shocks.

A still further object of this invention resides in the provision of means for adjusting the head light for maintaining the same in accurate operative position relative to the steering mechanism of the vehicle. And a still further object of the invention is the provision of means for preventing any evil results which may be occasioned by the vibrations or variations of any of the mechanisms constituting structures of this character.

These and other objects will more fully appear and the nature of the invention will be more clearly understood by the construction, combination and arrangement of parts thereof as described in the following specification, defined in the appended claims and illustrated in the accompanying drawings in which, Figure 1 is a side view of the front portion of an automobile, with one of the front wheels removed, showing my device mounted upon the frame of the vehicle and in operative position. Fig. 2, is a vertical sectional view of the support for the head light showing the means provided for absorbing the undue shocks and the means for preventing the rebounding action resulting from the shocks sustained by the vehicle. Fig. 3, is a similar view as that shown in Fig. 2, but showing other means for absorbing the shocks and for preventing the rebounding action occasioned thereby. Fig. 4, is a fragmentary side view of the support for the lamp showing a different construction of the means for absorbing the shocks as well as the rebounding action occasioned thereby. Fig. 5 is a side view of the front portion of an automobile with one of the front wheels removed, showing my device mounted upon the frame of the vehicle and in operative position, but illustrating a slightly modified form of my invention. Fig. 6 is a perspective view of my invention as shown in Fig. 5, showing only a fragmentary portion of the connecting rod of the steering mechanism. Fig. 7 is a fragmentary side elevation of the device shown in Fig. 6, excepting, the same illustrates a modified form of the connection between the lamp stem and the connecting rod of the lamp steering mechanism for operating the lamp as well as to provide for the variances of the parts of an automobile construction.

It is deemed proper to here state that for the sake of clearness and convenience I have only shown one of the lamps, and the support therefor at one side of an automobile, but it is to be understood that the construction and the arrangement of the parts as here shown are to be duplicated at the opposite side of an automobile or other vehicle.

Referring to the drawings in detail, 1 denotes the frame of an automobile and 2 the engine hood thereof, and positioned below the frame 1, is the front axle 3 upon which is mounted the spring 4, the spring being connected to the forward end of the frame 1, as at 5, the opposite end of the spring 4 being connected to the link 6 as at 7, and the link 6 being secured to the frame 1 in any suitable manner as shown at 8. Mounted upon the axle 3 is the swivel 9 of the stub axle, and upon the stub axle is mounted the left hand front wheel 10 of the automobile. The stub axle swivel 9 is provided with the controlling arm 11, the same being connected to the usual connecting bar 12 of the steering mechanism.

Mounted upon the frame 1 is the cylindrical support 13 provided with the straps 14 secured to the frame 1 by any well known fastening means as shown at 15, and slidably mounted within the cylindrical support 13 is the cylinder 13' said cylinder being provided with the cap 16 at the upper end thereof, the said cap and the cylinder 13' being secured together by the screw threaded portions 17. The edge of the cap resting upon the top end of the cylindrical support 13 forms a bearing for the cylinder 13' at that point. The cap 16 is provided with a central aperture 18 to permit the stem 35 to pass therethrough. Secured to the lower end of the cylinder 13' by means of the screw threads 21, is the tubular member 20, extending downwardly to a point below the horizontal line of the axle 3 and pivotally connected at 22 to the horizontally disposed sleeve member 23. The sleeve member 23 is adapted to receive the horizontal rod 24, which rod 24 and sleeve 23 are designed for telescopic connection, the rod 24 being pivotally connected at 25 to the ear member 26 said member 26 being provided with a screw threaded shank 27, the shank being adapted for passing through the apertured end 28 of the bracket 30 and retained thereat through the means of the locking bolts 31. The bracket 30 is mounted upon the connecting bar 12, which bar is preferably square in cross section and the bracket 30 is provided with an aperture through which the bar 12 is designed to pass. The bracket 30 is further provided with the set screw 32 for retaining the bracket in fixed relation with the bar 12 at any desired and efficient point. The bracket 30 is thus capable of adjustment upon the bar 12 providing for the maintenance of the head light 37 in accurate operative position relative to the steering mechanism.

The cylinder 13' has arranged for operating therein the stem 35 which stem is designed to project downwardly into the tubular member 20 and to pass through the cylinder 13' and outwardly through the aperture 18 of the cap 16 and extends upwardly and is provided at the extremity thereof with the diverging arms 36 for engaging the head light 37 by any suitable means of connection as at 38. The stem 35 has formed at the lower end thereof the elongated slot 35' and adapted to travel upon the lug 20' formed upon the inner wall of the tubular member 20 and adjacent the upper end thereof, this connection being provided to form a positive connection between the tubular member 20 and the stem 35 for causing the lamp 37 to be actuated simultaneously with the tubular member 20, this connection, however, permits the longitudinal movement of the member 20 and the stem 35 relative to each other. Within the cylinder 13' and secured upon the stem 35 is the collar 40, the collar being positioned upon the stem 35 at a point approximately intermediate of the ends of the cylinder 13', and between the collar 40 and the lower end of the cylinder 13' and surrounding that portion of the stem 35 is the spring 41 having its lower end seated upon the bottom of the cylinder 13' and the other end operating against the under side of the collar 40, the spring 41 being designed to absorb the shocks which may occur due to the unevenness of the surface over which the vehicle may travel, and arranged around the stem 35 and adapted to operate between the upper face of the collar 40 and the cap 16 of the cylinder 13' is the spring 42, this spring being designed to restrict the rebounding action occasioned by the shocks.

In Fig. 3, I have shown a similar form of construction as that shown in Fig. 2, excepting the means for absorbing the shocks and the means for preventing the rebounding action occasioned thereby are different for in the place of the shock absorbing spring 41 I used the rubber cushioning tube 43, and in lieu of the rebounding spring 42 I use the rubber cushioning 44.

In Fig. 4, in place of the cylinder 13' and the springs 40 and 41 or the rubber cushioning means 43 and 44 within the cylinder 13', I extend the tubular member 20 upwardly through the support 13 and above the same and within which the said tubular member is revolubly mounted and retained thereat by the collar 50 bearing upon the top edge of the cylinder 13. The stem 35 is telescopically mounted within the tubular member 20. Adjacent to the upper end of the tubular member 20 is positioned the coil spring 45 provided with the diverging arms 46 and 47, the arm 46 being connected to the tubular member 20 by the pin or other connection 48 and the arm 47 being connected to the stem 35 by the headed pin or other connection 49, the coil spring 45 together with the arms 46 and 47 and the respective connections with the stem 35 of the member 20 resiliently sustain the stem 35 relatively within the tubular member 20, the functions of the spring 45 being the same as the shock absorbing and rebounding means shown in Figs. 2 and 3.

Figs. 5 and 6 illustrate a modified form of my invention comprising a tubular support 51 provided with a set screw 55 and attached to the support 51 is the bracket 52 secured to the automobile frame 1 through the medium of the bolts or other fastening means 53. Arranged within the support 51 and designed for longitudinal adjustment therein is the elongated cylinder 54 having screw-threaded thereon at its upper end, the apertured cap 56 and also screw-threaded upon the bottom portion of the cylinder 54 is a similar apertured cap 57. Rotatably mounted longitudinally slidable through the cylinder 54 is the lamp supporting rod or stem 58, the same being provided with the yoke 59 for supporting the lamp 37 through its engagement with the ears 38 arranged upon the lamp.

Upon the stem 58 adjacent the yoke 59 and screw threaded thereon is the adjusting and retaining flanged nut 60, and interposed between the cap 56 and the nut 60 is the spring 61 with its opposite ends bearing against the flange of the nut 60 and the upper surface of the cap 56 respectively for retaining the lamp in its normal elevated position and also for absorbing any shocks which may be transmitted to the lamp. Arranged adjacent the lower end of the stem 58 and screw threaded and adjustably arranged thereon is the flange nut 62 and between which and the face of the cap 57 is the spring 63 also having its opposite ends bearing against the respective opposing faces of the flange nut 62 and the cap 57 and designed to coact with the spring 61 for absorbing shocks as well as to relieve the lamp of the rebounding action occasioned by the shocks. The flange nuts 60 and 62 are designed for not only forming bearing surfaces for the springs 61 and 63 and also for retaining the same in their proper operative positions, but are also designed as a means of adjustment for adjusting the stem 58 relative to the cylinder 54 for positioning the lamp at the desired point of elevation, and further to compensate for various lengths of springs when it is necessary to introduce others.

Arranged upon the lower end of the stem 58 is the L coupling 64 to which is connected the horizontal rod 65 provided at its end with the ear 66, the same being connected with the ear 67 of the actuating rod 68 through the medium of the bolt or other suitable connections 69. The actuating rod 68 is elongated and has its opposite end connected to the brackets 70 through the means of a bolt, set screw or other efficient means of connections as shown at 71, the brackets 70 being adjustably mounted upon the steering rod 12 and retained thereon in its adjusted position by the set screw 72.

In Fig. 7 I have shown a slightly modified form of the invention, the same being similar in its construction throughout, excepting, that in lieu of the horizontal rod 65 and the actuating rod 68, I connect to the L coupling 64 the horizontal tubular member 73 and into which is telescopically mounted the rod 74 which is provided at its free end with the transversely disposed elongated end portion 75 provided with elongated slot 76 designed to travel upon the horizontally disposed bolt 77 and retained thereon by the enlarged head thereof, the bolt 77 being secured within the free end of the depending and slightly curved arm 78 of the bracket 79 adjustably mounted upon the connecting rod 12 of the steering mechanism and retained in its adjusted position by the set screw 80.

In the construction shown in Figs. 5, 6 and 7, the bracket 52 is designed to be secured to the frame 1 of the automobile or to the axle, upon the spring or at any reasonable and suitable point upon the vehicle, and these various positions for placing the lamp at a certain desired point upon the vehicle is accomplished by the relative mounting of the cylinder 54 within the support 51, it being obvious from the fact that the support 51 being capable of rotation upon the cylinder 54 as well as longitudinally slidable upon the same may be retained in any of the desired positions through the means of the binding or set screw 55 carried by the support 51 for engaging the outer surface of the cylinder 54.

It is to be here noted that the horizontal rods for operating the lamp stems are to be of a length slightly shorter than that of the stub axle arm of the vehicle and by which construction the lamps are laterally deflected slightly in advance of the lateral movement of the front steering wheels for more efficiently lighting the way at points around the curves, at the same time the lamps will be returned directly forward when the steering wheels have been set for directing the machine in its straight course.

The operation of my invention is obvious from the description and the drawings, however, it is to be noted that in the construction and arrangement of the parts of this invention, the adjustment of the head light for maintaining the same accurately and in unison relative to the steering mechanism is accomplished by means of the adjusting bracket arranged upon the connecting rod of the steering mechanism, the bracket being retained in its proper adjusted position by the set screw engaging the connecting rod, and by the further provision of the pivotal connections with the tubular member and the bracket respectively and the interposition of the telescopic members between the pivotal points provides means for preventing any vibrations or variations of the correlated parts from effecting the position and functions of the head light 37, these are very essential features of my invention for obviating the difficulties which arise in structures of this character and I have, therefore, devised means whereby such difficulties and objectionable features are wholly eliminated.

While I have here shown the preferred form of my invention, I hereby reserve the right to make any alterations and variations therein which will not depart from the spirit of the invention or conflict with the scope of the claims.

Having thus fully described my invention, what I claim as new, and desire to secure by Letters Patent is:

1. In combination with a vehicle and the steering mechanism thereof, of a supporting cylinder and means to rigidly secure said cylinder to the frame of the vehicle; a lamp supporting stem rotatively mounted therein; means connecting the said stem with said steering mechanism for actuating the stem, and resilient means engaging said stem to resist both upward and downward movement of the stem with relation to the cylinder.

2. In combination with a vehicle having suitable steering mechanism of a lamp bracket comprising a tubular support; means to secure the said support to the frame of the vehicle; an elongated cylinder adjustably mounted in said tubular support, provided with screw threaded apertured caps at each end; a lamp supporting stem rotatively mounted within the elongated cylinder, and having a yoke on its upper extremity and screw threaded, flanged nuts adjacent each end; resilient springs interposed between the said caps and said flanged nuts, and means to connect the lamp stem with the said steering mechanism whereby the lamps are held in adjustment with the varying line of progression of the said vehicle.

In testimony whereof I have signed my name to this specification in the presence of two subscribing witnesses.

JAY R. DOUGLAS.

Witnesses:
C. E. DALLAS,
C. M. LOWE.